United States Patent [19]
Higuchi

[11] Patent Number: 4,475,413
[45] Date of Patent: Oct. 9, 1984

[54] VARIABLE RATIO RACK AND PINION STEERING GEAR

[75] Inventor: Megumu Higuchi, Tokyo, Japan

[73] Assignee: Nissan Motor Company, Limited, Yokohama City, Japan

[21] Appl. No.: 312,137

[22] Filed: Oct. 16, 1981

[30] Foreign Application Priority Data

Oct. 16, 1980 [JP] Japan ................. 55-143689

[51] Int. Cl.³ ............... F16H 1/04; B62D 1/20
[52] U.S. Cl. ........................... 74/422; 74/498
[58] Field of Search .............. 74/422, 498, 508

[56] References Cited

U.S. PATENT DOCUMENTS

| | | | |
|---|---|---|---|
| Re. 28,740 | 3/1976 | Bishop | 74/422 |
| 3,064,491 | 11/1962 | Bishop | 74/498 |
| 3,267,763 | 8/1966 | Merritt | |
| 4,133,221 | 1/1979 | Clary | 74/498 |

FOREIGN PATENT DOCUMENTS

| | | | |
|---|---|---|---|
| 241798 | 11/1962 | Australia | |
| 52-29049 | 7/1977 | Japan | |
| 55-51665 | 4/1980 | Japan | 74/508 |
| 1439337 | 6/1976 | United Kingdom | 74/498 |

Primary Examiner—Lawrence J. Staab
Assistant Examiner—Michael D. Bednarek
Attorney, Agent, or Firm—Schwartz, Jeffery, Schwaab, Mack, Blumenthal, Koch

[57] ABSTRACT

In accordance with the present invention, there is provided a novel and improved varibale ratio rack and pinion steering gear wherein the pinion has teeth of variable shape and size and the rack has teeth of variable shape and size. The teeth of the pinion are correctly meshable with a uniformly shaped rack profile and adapted to provide variable pitch circles. The teeth of the rack are generated by using the profile of the pinion teeth in a manner to provide a varying gear ratio even when the steering angle is larger than 180°.

5 Claims, 12 Drawing Figures

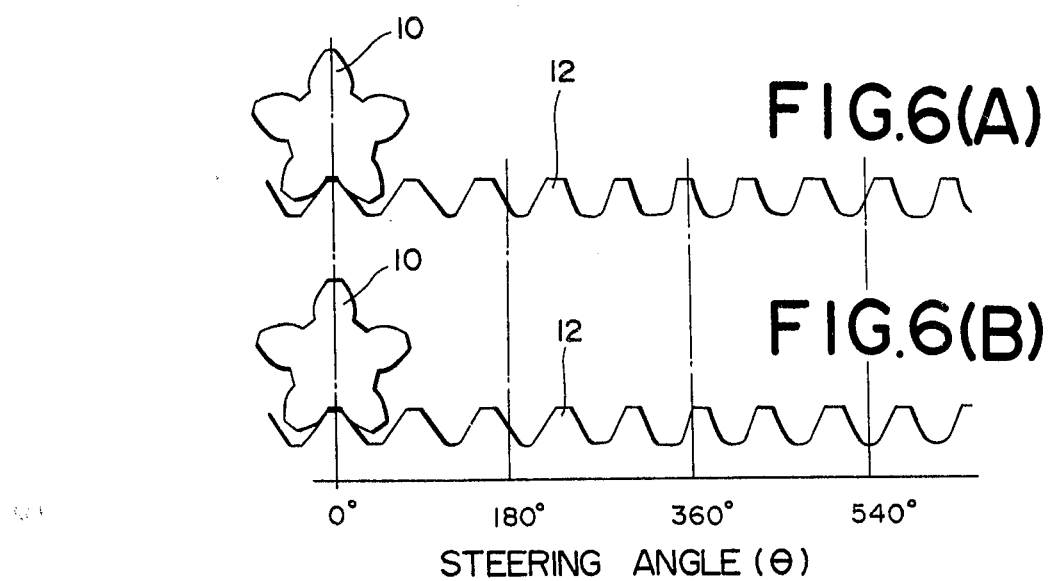
FIG.6(A)
FIG.6(B)
STEERING ANGLE (θ)
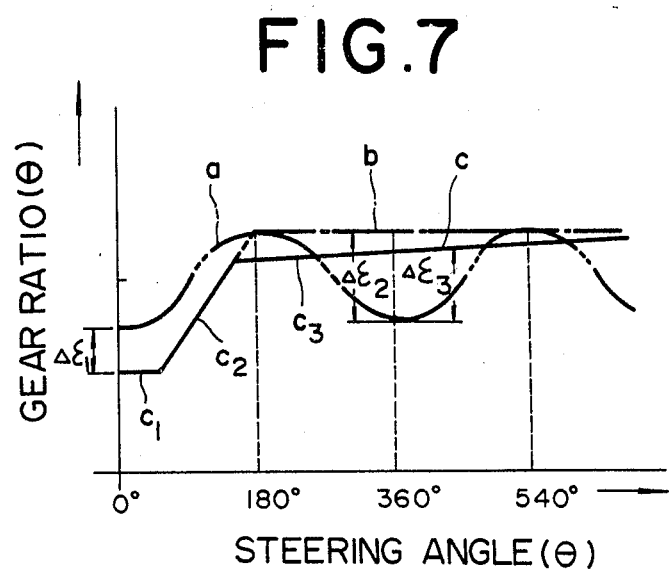
FIG.7
STEERING ANGLE (θ)

VARIABLE RATIO RACK AND PINION STEERING GEAR

BACKGROUND OF THE INVENTION

1. Field of the Invention

The present invention relates to a variable ratio rack and pinion steering gear for road vehicles.

2. Description of the Prior Art

A typical form of variable ratio rack and pinion steering gear is disclosed in the Japanese Patent Publication No. 52-29049 and wherein the pinion is formed to be a standard helical pinion having identical involute teeth whilst the rack is formed to be a variably countoured rack having teeth of variable shape and pitch or size. The rack teeth are adapted to be generated by using a cutter having blades of the same tooth form as that of the pinion, i.e., the rack teeth are adapted to be generated by using the profile of the pinion teeth.

The rack and pinion steering gear of the abovedescribed type encounters a difficulty of obtaining an adequate strength in the rack, particularly when a relatively wide variation of gear ratio is required. This is due to the fact that the rack teeth tend to have, at the region for providing a relatively small gear ratio, a tendency to be of great large pressure angles and, therefore, to be sharp-edged at the tops and also have, at the region for a relatively small gear ratio, a tendency to have undercuts at the roots. In the case where this tendency is pronounced, a considerably wide variation in strength of the rack and therefore a considerable reduction in steering force transfer efficiency will inevitably result.

SUMMARY OF THE INVENTION

In accordance with the present invention, there is provided a novel and improved variable ratio rack and pinion steering gear. The pinion is of a circular form and has a concentric addendum circle. The teeth of the pinion are correctly meshable with a uniformly toothed rack profile and adapted to provide such a variable pitch circle radius that is at a maximum at a predetermined position of the pinion, gradually reduces with the rotary movement of the pinion in either direction out of the predetermined position and is at a minimum at 180° of rotary movement of the pinion out of the predetermined position. The rack in mesh with the pinion is generated by using the profile of the pinion teeth in a manner to provide a substantially constant gear ratio when the pinion is at or adjacent the predetermined position thereof, a widely varying gear ratio for a given rotary movement of the pinion when the operating angle of the pinion is relatively small, and a gradually varying gear ratio for a given rotary movement of the pinion when the operating angle of the pinion is relatively large.

With the rack and pinion constructed as above in accordance with the present invention, a wide variation of gear ratio can be attained without sacrificing the strength or rigidity of the steering gear, particularly of the rack teeth.

It is an object of the present invention to provide a novel and improved variable ratio rack and pinion steering gear which eliminates or at least effectively mitigates the foregoing drawbacks inherent in the prior art variable ratio rack and pinion steering gears of the described type.

It is a further object of the present invention to provide a novel and improved variable ratio rack and pinion steering gear of the above-mentioned character which is positively and assuredly enabled to have a wider variation of gear ratio without substantially sacrificing the strength or rigidity of the steering gear, particularly of the rack teeth.

BRIEF DESCRIPTION OF THE DRAWINGS

The features and advantages of the variable ratio rack and pinion steering gear according to the present invention will become more clearly appreciated from the following description taken in conjunction with the accompanying drawings, in which:

FIG. 6(A) shows another example of variable ratio rack and pinion constructed to provide variable ratio characteristics represented by the line "b" in the graph of FIG. 7 and wherein the pinion in the form of FIG. 5 is used;

FIG. 6(B) is a view similar to FIG. 6(A) but shows an embodiment of the present invention;

FIG. 7 shows variable ratio characteristics provided by the rack and pinion of FIG. 6(B);

DESCRIPTION OF THE PREFERRED EMBODIMENT

Figure 1:
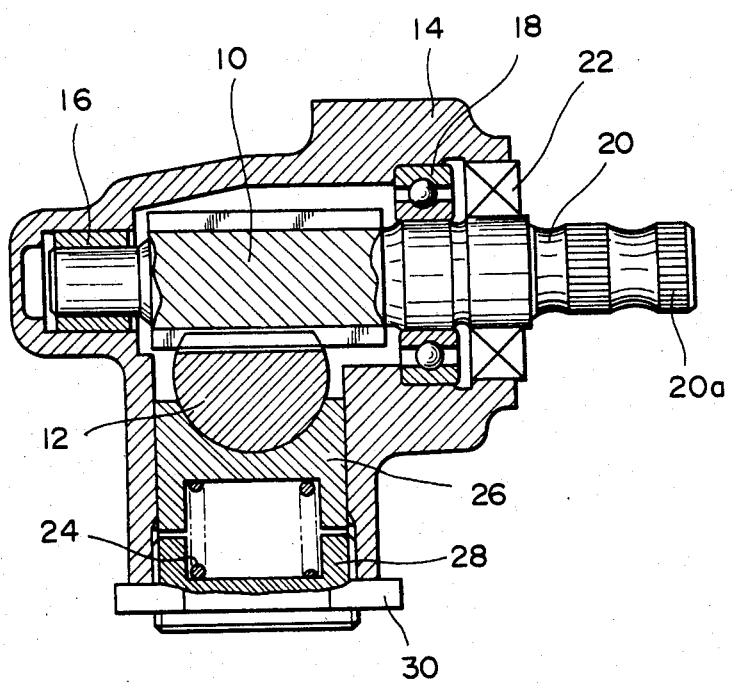
FIG. 1 shows a variable ratio rack and pinion steering gear embodying the present invention.

Referring first to FIG. 1, a variable ratio rack and pinion steering gear for an automotive vehicle is shown to comprise a pinion 10 and a rack 12. The pinion 10 is rotatably supported in a gear casing 14 through bearings 16 and 18. The rack 12 is in mesh with the pinion 10 and axially movable in the gear casing 14 in accordance with the rotary movement of the pinion 10. A pinion shaft 20 is provided with serrations 20a and adapted to be connected to, though not shown, a steering shaft which is, in turn, connected to a steering wheel. A sealing member 22 is arranged to provide a seal between the pinion shaft 20 and the gear casing 14. The rack 12 has its opposite ends projecting from the gear casing 14 and adapted to be connected at the opposite ends to steerable road wheels of the vehicle. A spring 24 is arranged to urge the rack 12 against the pinion 10 by way of a retainer 26, and its intensity is adjustable by advancing or retreating an adjusting nut 28. The nut 28 is locked at a set position by means of a lock nut 30 after the adjustment of the intensity of the spring 24.

The above structure substantially follows the conventional fashion. To produce a desired variable ratio relationship the pinion 10 and the rack 12 are constructed and arranged in accordance with the present invention as will be described hereinbelow.

Figure 2:
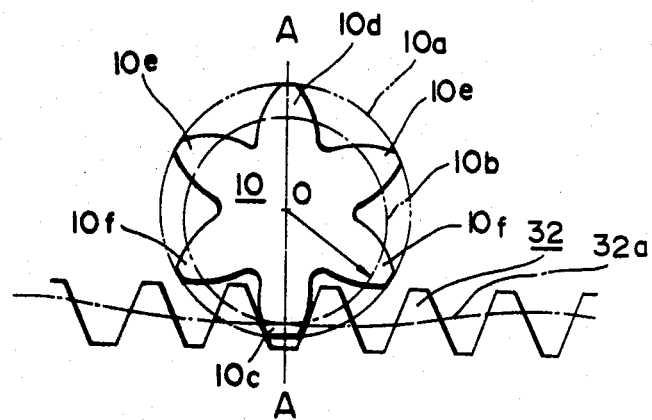
FIG. 2 shows a pinion for use in the steering gear of the present invention and a uniformly shaped rack tooth profile.

FIG. 2 shows the tooth profile of the pinion 10 for use in the steering gear of the present invention. The pinion 10 is a circular gear having an addendum circle 10a concentric with the center O of rotation of the pinion. The teeth of the pinion 10 are of variable shape and size and correctly meshable with a uniformly toothed rack profile 32. The rack tooth profile 32 is uniform in shape and size and preferably a standard rack tooth profile as illustrated. The pinion 10 is adapted to provide varying pitch circles and more specifically adapted to provide an effective pitch circle radius $r_p$ which is at a maximum at a central or datum position of the pinion or when the operating angle of the pinion is zero, reduces gradually with the rotary movement of the pinion in either direction out of the datum position and is at a minimum when the operating angle of the pinion out of the datum position is 180°. The datum position of the pinion 10 is aligned with the straight-ahead position of the steering wheel. The pinion 10 is therefore given an intermeshing pitch line or curve 10b which is symmetrical about the axis A—A aligned with the datum position. More specifically, the pinion 10 is shown to comprise six teeth including diametrically opposed first and second teeth 10c and 10d. The first pinion tooth 10c is symmetrical about the axis A—A and adapted to provide a maximum pitch circle radius at the middle point thereof, whilst the second pinion tooth 10d is also symmetrical about the axis A—A and adapted to provide a minimum pitch circle radius at the middle point thereof. The remaining two pairs of teeth 10e and 10f on the respective sides of the axis A—A of symmetry are adapted to provide a gradually reducing pitch circle radius as the pinion rotates progressively in either direction out of the datum position thereof. Each of the pinion teeth 10e and 10f does not have a symmetrical profile. The pinion 10 is generated by using a hob or cutter having blades of the same tooth form as the uniformly toothed rack profile 32 which is preferably a standard rack tooth profile as shown in FIG. 2.

In the variable ratio rack and pinion steering gear of the present invention, the pinion 10 constructed in the above manner is used, and the gear ratio is adapted to vary as the position of meshing engagement of the pinion 10 and the rack 12 changes with the rotary movement of the steering wheel. However, when the teeth of the rack 12 are constructed to be of uniform shape and size as, for example, of the standard rack tooth profile 32, the resulting variable ratio characteristics of the rack and pinion steering gear will be represented by such two-dotted chain line "a" in the graph of FIG. 7. That is, the resulting ratio characteristics are represented by the undulating or waved line "a" in the graph of FIG. 7 which undulates in cycles in the way of completing one cycle per one revolution of the pinion 10 in response to the rotation $\theta$ of the steering wheel.

The variable ratio characteristics of rack and pinion steering gear normally considered desirable are as represented by the chain line "b" in the graph of FIG. 7. That is, when the steering angle $\theta$ is smaller than 180°, a relatively small gear ratio is desired for the purpose of obtaining a high-speed stability, whereas when the steering angle $\theta$ is larger than 180°, a relatively large gear ratio is desired for the purpose of obtaining a light and smooth feel in steering operation under low-speed turning or standstill conditions.

Figure 3:
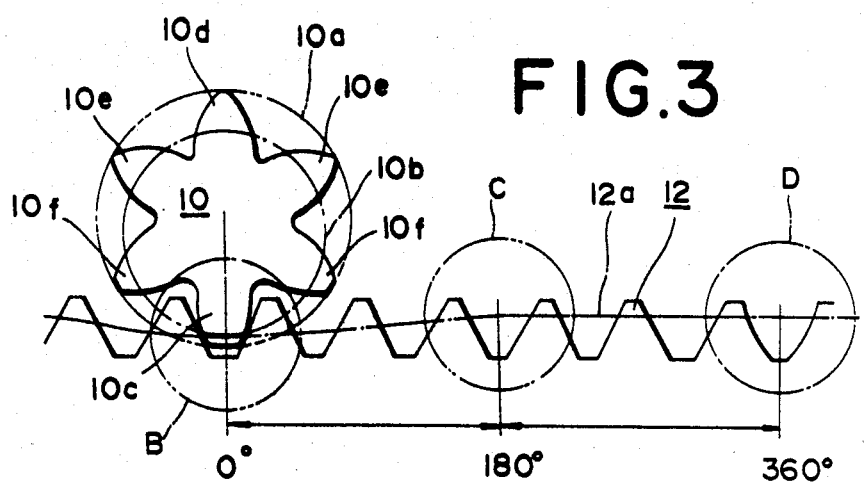
FIG. 3 shows an example of variable ratio rack and pinion constructed to provide variable ratio characteristics represented by a chain line "b" in a graph of FIG. 7.
Figures 4A, 4B, 4C:
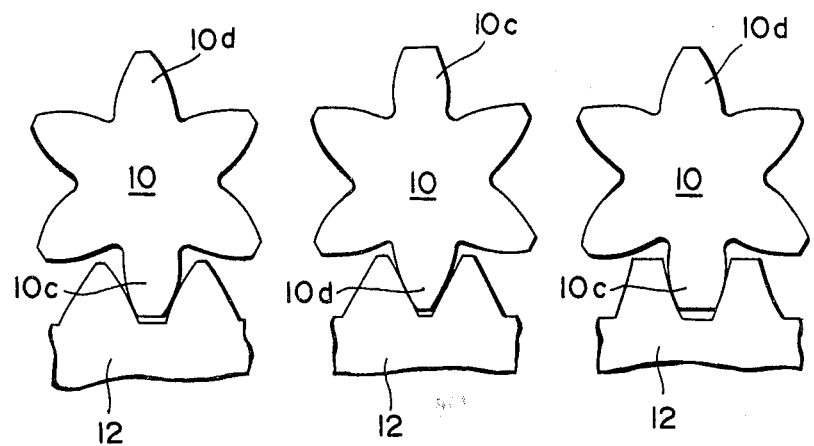
FIGS. 4(A), 4(B) and 4(C) show three operative conditions of the rack and pinion of FIG. 3 and show three rack sections corresponding to sections (B), (C) and (D) of FIG. 3, respectively.

To achieve such desired variable ratio characteristics the rack 12 is constructed to have such a tooth profile as shown in FIG. 3. That is, the rack 12 is generated by using the profile of the pinion 10 teeth in a manner to provide such non-uniformity of relative movement of the pinion 10 and the rack 12 that enables to provide desired variable ratio characteristics represented by the line "b" in the graph of FIG. 7. The rack 12 produced in the above manner is given an intermeshing pitch line 12a when arranged to cooperate with the pinion 10 having the intermeshing pitch line 10b. The teeth of the rack 12 generated in the above manner by using the profile of the pinion 10 teeth have at the region near the midpoint corresponding to the steering angle of zero plus-shifted tooth profile as shown in FIG. 4(A), at the region corresponding to the steering angle of about 180° tooth profiles similar to the standard rack tooth profile 32 as shown in FIG. 4(B), and at the region corresponding to the steering angle of about 360° minus-shifted tooth profiles as shown in FIG. 4(C). This is due to the fact that the teeth of the pinion 10 constructed in the above manner have, at the region including the pinion tooth 10c, relatively small pressure angles and also have, at the region including the pinion tooth 10d, relatively large pressure angles.

While the profile of the rack 12 teeth of FIG. 3 is effective to some extent in overcoming the foregoing drawbacks inherent in the prior art steering gear, such rack teeth still have, at the region corresponding to the steering angle of about 360° (similarly at about 720°), a tendency to have undercuts at the roots.

Figure 5:
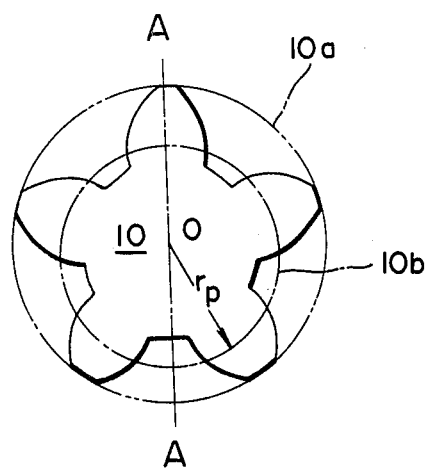
FIG. 5 shows a modified form of a pinion for use in the steering gear of this invention.

FIG. 5 shows a modified form of the pinion 10 with five teeth. The pinion 10 is constructed in the manner similar to the previous form and has a concentric addendum circle 10a and a symmetrical intermeshing pitch line or curve 10b. The pitch circle radius $r_p$ of the pinion 10 is variable with the angular movement of the pinion in the manner similar to the previous form.

FIG. 6(A) shows another example of variable ratio rack and pinion constructed to provide variable ratio characteristics represented by the line "b" in the graph of FIG. 7 and wherein the pinion in the form of FIG. 5 is used. The rack and pinion of this example produce substantially the same effect as those of the previous example of FIG. 3. That is, while the profile of the rack 12 teeth of FIG. 6(A) is effective to some extent in overcoming the foregoing drawbacks inherent in the prior art steering gear, such rack teeth still have, at the region corresponding to the steering angle of about 360° (similarly at about 720°), a tendency to have undercuts at the roots.

FIG. 6(B) is a view similar to FIG. 6(A) but shows an embodiment of the present invention. In the embodiment of the present invention, while the pinion 10 in the form of FIG. 5 is used as in the example of FIG. 6(A), the rack 12 is generated by using the profile of the pinion 10 teeth in a manner to achieve such variable ratio characteristics as represented by a solid line "c" in the graph of FIG. 7. That is, in or adjacent the central position of the steering wheel the gear ratio is at a minimum and held constant, as indicated by a line section $c_1$. As the steering wheel is turned in either direction away from the central position or as the steering angle $\theta$ increases, the gear ratio increases sharply or rapidly for a given rotary movement of the steering wheel, as indicated by a line section $c_2$, after having been held constant along the line section $c_1$. As the steering wheel is turned further or as the steering angle $\theta$ increases beyond about 180°, the gear ratio comes to increase gradually or slowly for a given rotary movement of the steering wheel, as indicated by the line section $c_3$. The characteristics line "c" is thus adapted to conform at the line sections $c_1$ and $c_2$ to the characteristics line "b" but not at the line section $c_3$. The line section $c_3$ deviates maximumly from the characteristics line "b" when the steering angle $\theta$ is about 180° and goes nearer thereto as the steerig angle $\theta$ becomes larger.

The rack 12 of FIG. 6(B) constructed in the above manner according to the present invention can attain an improved strength for a given size more assuredly and efficiently than the previous examples of FIG. 3 and 6(A), as will be understood from the graph of FIG. 7. Namely, the profile of the rack teeth generated to obtain the characteristics line "b" deviates from the standard rack tooth profile in substantially proportional relationship to the deviation of the characteristics line "b" from the characteristics line "a" in the graph of FIG. 7, whilst the profile of the rack teeth generated to obtain the characteristics line "c" deviates from the standard rack tooth profile in substantially proportional relationship to the deviation of the characteristics line "c" from the characteristics line "a" in the graph of FIG. 7. In this connection, the racks 12 of FIGS. 6(A) and 6(B) have at the region corresponding to the steering angle of zero a common deviation of $\Delta\epsilon_1$ and also have at the region corresponding to the steering angle of 360° (similarly at 720°) deviations $\Delta\epsilon_2$ and $\Delta\epsilon_3$, respectively. Since the deviations $\Delta\epsilon_3$ is smaller than $\Delta\epsilon_2$, the profile of the rack 12 teeth of FIG. 6(B) is, as a whole, more similar to the standard rack tooth profile. Furthermore, since the deviation $\Delta\epsilon_1$ is not so large, it does not cause any pointed or sharp-edged tops.

Figure 9:
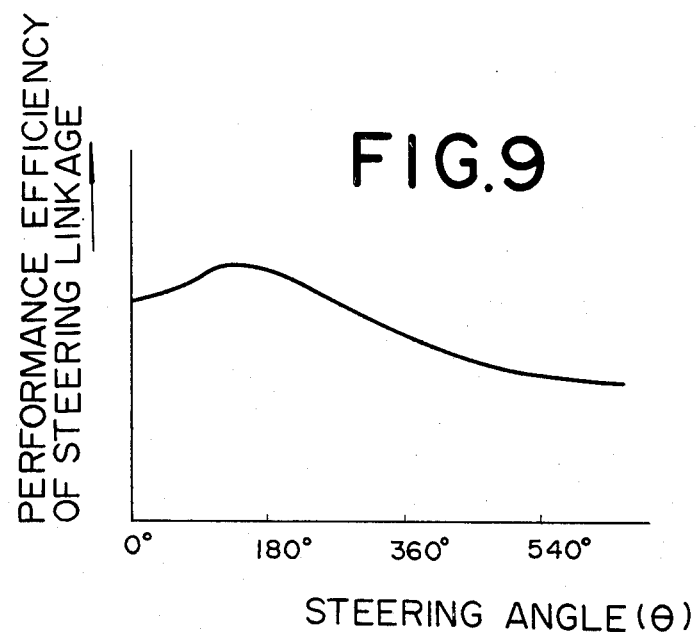
FIG. 9 shows the variation of a performance efficiency of a steering linkage with respect to a steering angle.

In the embodiment of FIG. 6(B), the gear ratio is adapted to increase gradually even when the steering angle $\theta$ is relatively large. This ratio characteristics "c" is optimally combined with the performance characteristics of a steering linkage to enable to maintain the steering effort substantially constant throughout the steering operation from lock to lock. That is, as shown in FIG. 9, the performance efficiency of the typical steering linkage comprising side rod assemblies, knuckle arms and so on, is at a maximum when the steering angle is about 180° and then reduces gradually as the steering angle $\theta$ increases.

Figure 8:
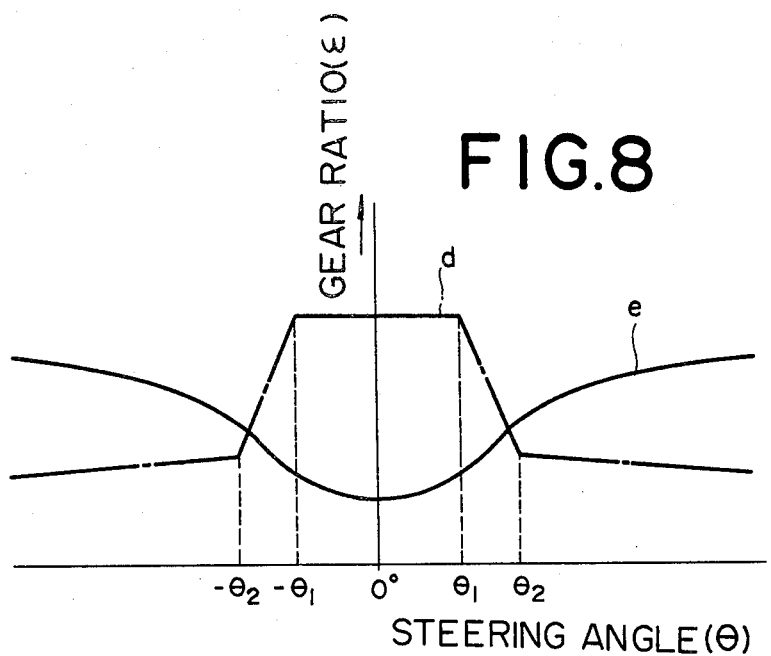
FIG. 8 shows modified variable ratio characteristics obtainable in accordance with the present invention.

In FIG. 8, a ratio characteristics line "d" is shown which is particularly suited for use in power-assisted steering system and adapted to effect, in a manner completely opposite from the ratio characteristics "c", such as a variable ratio that is at a maximum and kept substantially constant when the steering wheel is at or adjacent the central position (corresponding to the steering angle ranging from $-\theta_1$ to $\theta$), reduces sharply or rapidly for a given rotary movement of the steering wheel when the steering angle varies from $\theta_1$ to $\theta_2$ or $-\theta_1$ to $\theta_2$, and reduces gradually or slowly for a given rotary movement of the steering wheel when the steering angle varies beyond $\theta_2$ or $-\theta_2$. In this case, the same effects as the embodiment of FIG. 6(B) can be attained by constructing and arranging so that the pitch circle of the pinion 10 is at a minimum when the operating angle of the pinion is zero and at a maximum when the operating angle of the pinion is 180°.

With the ratio characteristics represented by the line "d", the variation of gear ratio occurs rectilinearly or along a straight line. Alternative to the ratio characteristics "c", such ratio characteristics may be used that are shown by a curve "e" in FIG. 8. With this characteristics curve "e", the gear ratio varies smoothly along the curve. In this case, when a variation of steering angle occurs within the range from $-\theta_1$ to $\theta_1$, the gear ratio varies along a curve calculated by the following equation:

$$\epsilon = \alpha \cdot \theta^\beta + \delta \text{ where } \alpha, \beta, \delta \text{ are constants}$$

When the steering angle is larger than $\theta$, the gear ratio varies along a curve calculated by the following equation:

$$\epsilon = \gamma(\theta \pm \rho)^\sigma \text{ where } \gamma, \rho, \sigma \text{ are constants}$$

The ratio characteristics curve "e" enables a smooth variation of gear ratio and therefore a smooth and light feel in steering operation.

Obviously, many variations and modifications of the present invention are possible in light of the above teachings. It is, therefore, to be understood that within the scope of the appended claims, the invention may be practiced otherwise than as specifically described.

What is claimed is:

1. A variable ratio rack and pinion steering gear comprising:

a circular driving pinion having a plurality of teeth, an axis of rotation, and an addendum circle concentric with said axis of rotation, the teeth of the pinion being formed to correctly mesh with a uniformly toothed rack profile and to provide a variable pitch circle radius which variable radius (a) has a maximum at a predetermined position of the pinion, (b) reduces gradually in accordance with rotary movement of the pinion in either direction from said predetermined position, and (c) has a minimum at 180° of rotary movement from said predetermined position; and a driven rack adapted to mesh with the pinion, the teeth of the rack being formed from a profile of said pinion teeth to provide a substantially constant gear ratio when the pinion is at or adjacent said predetermined position, a widely varying gear ratio for a given rotary movement of the pinion when the operating angle of the pinion is relatively small, and a gradually varying gear ratio for a given rotary movement of the pinion when the operating angle of the pinion is relatively large.

2. A variable ratio rack and pinion steering gear comprising:

a circular driving pinion having a plurality of teeth, an axis of rotation, and an addendum circle concentric with said axis of rotation, the teeth of the pinion being formed to correctly mesh with a uniformly toothed rack profile and to provide a variable pitch circle radius which variable radius (a) has a maximum at a predetermined position of the pinion, (b) reduces gradually in accordance with rotary movement of the pinion in either direction from said predetermined position, and (c) has a minimum at 180° of rotary movement from said predetermined position; and a driven rack adapted to mesh with the pinion, the teeth of the rack being formed from a profile of said pinion teeth to provide a substantially constant minimum gear ratio when the pinion is at or adjacent said predetermined position, a rapidly increasing gear ratio for a given rotary movement of the pinion out of said predetermined position when the operating angle of the pinion is relatively small, and a gradually incresasing gear ratio for a given rotary movement of the pinion out of said predetermined position when the operating angle of the pinion is relatively large.

3. A variable ratio rack and pinion steering gear comprising:

a circular driving pinion having a plurality of teeth, an axis of rotation, and an addendum circle concentric with said axis of rotation, the teeth of the pinion being formed to correctly mesh with a uniformly toothed rack profile and to provide a variable pitch circle radius which variable radius (a) has a maximum at a predetermined position of the pinion, (b) reduces gradually in accordance with rotary movement of the pinion in either direction from said predetermined position, and (c) has a minimum at 180° of rotary movement from said predetermined position; and a driven rack adapted to mesh with the pinion, the teeth of the rack being formed from a profile of said pinion teeth to provide a substantially constant minimum gear ratio when the pinion is at or adjacent said predetermined position, a rapidly decreasing gear ratio for a given rotary movement of the pinion out of said predetermined position when the operating angle of the pinion is relatively small, and a gradually decreasing gear ratio for a given rotary movement of the pinion of said predetermined position when the operating angle of the pinion is relatively large.

4. A variable ratio rack and pinion steering gear as set forth in claim 1, 2 or 3, wherein transition from said substantially constant minimum gear ratio to the gear ratio for a given rotary movement of the pinion out of said predetermined position is non-rectilinear.

5. A variable ratio rack and pinion steering gear as set forth in claim 1, wherein said pinion has five teeth.

* * * * *